United States Patent
Won et al.

(10) Patent No.: US 7,029,559 B2
(45) Date of Patent: Apr. 18, 2006

(54) PROTON EXCHANGE COMPOSITE MEMBRANES, COMPOSITE SOLUTIONS, AND METHOD FOR MANUFACTURING AND FUEL CELL USING THE SAME

(75) Inventors: Jongok Won, Incheon (KR); Yong Soo Kang, Seoul (KR); In-Hwan Oh, Seoul (KR); Heung Yong Ha, Seoul (KR); Sangwook Choi, Seoul (KR); Jee Won Choun, Seoul (KR); Bum-Suk Jung, Seoul (KR)

(73) Assignee: Korea Institute of Science Technology, Seoul (KR)

( * ) Notice: Subject to any disclaimer, the term of this patent is extended or adjusted under 35 U.S.C. 154(b) by 579 days.

(21) Appl. No.: 10/228,778

(22) Filed: Aug. 27, 2002

(65) Prior Publication Data

US 2003/0054219 A1    Mar. 20, 2003

(30) Foreign Application Priority Data

Sep. 4, 2001    (KR) ............................. 2001-54158

(51) Int. Cl.
    *C25B 13/00*    (2006.01)

(52) U.S. Cl. .................. 204/296; 204/295; 429/30; 429/33; 429/40; 521/27

(58) Field of Classification Search ........... 204/295, 204/296; 429/30, 33, 40; 521/27
    See application file for complete search history.

(56) References Cited

U.S. PATENT DOCUMENTS

| 4,361,658 A | * | 11/1982 | Lundberg et al. ........... 523/132 |
| 5,919,583 A | | 7/1999 | Grot et al. |
| 6,051,643 A | * | 4/2000 | Hasegawa et al. .......... 524/445 |
| 6,059,943 A | | 5/2000 | Murphy et al. |
| 6,060,190 A | | 5/2000 | Campbell et al. |
| 6,299,939 B1 | * | 10/2001 | DuBois et al. .............. 427/243 |
| 6,844,097 B1 | * | 1/2005 | Fukuda et al. ................ 429/30 |

* cited by examiner

*Primary Examiner*—Bruce F. Bell
(74) *Attorney, Agent, or Firm*—Lucas & Mercanti, LLP

(57) ABSTRACT

An ion exchange composition membrane is made up of dispersed natural clay and/or organized clay in ion conducting polymeric film as a methanol barrier material. The membrane exhibits low methanol crossover, high proton conductivity and is thus suitable for use in direct methanol fuel cells with low costal advantage.

16 Claims, 3 Drawing Sheets

PROTON EXCHANGE COMPOSITE MEMBRANES, COMPOSITE SOLUTIONS, AND METHOD FOR MANUFACTURING AND FUEL CELL USING THE SAME

This patent application claims priority from Korean Patent Application No. 2001-54158 filed Sep. 4, 2001, the contents of which is incorporated herein by reference.

BACKGROUND OF THE INVENTION

1. Field of the Invention

The present invention relates to the field of ion exchange composite membranes. The present invention particularly describes proton exchange composite membrane, composite solution, a manufacturing method thereof, and a fuel cell comprising the same.

2. Discussion of the Related Art

Proton exchange membrane fuel cells employing hydrogen as a fuel exhibit high energy density but have several disadvantages. For example, hydrogen gas should be handled with particular care and intermediate step of reforming the alcohol into hydrogen.

Liquid-type fuel cells, on the other hand, employ liquid materials as a fuel and therefore operate at a lower temperature. Methanol is a favored fuel as it is easily obtained from natural gas or other renewable resources, it has a high specific energy density. It is liquid at operating temperatures, and most of all, the existing infrastructure for transporting petrol may easily be transformed to support methanol. A direct methanol fuel cell (DMFC) is a special form of liquid type fuel cell based on polymer electrolyte membrane fuel cell technology has received attention for a possibility of a replacement of primary and secondary batteries for potable and/or transport power source.

The DMFC can be fed with a gaseous or liquid fuel feed. As methanol is directly fed to the anode, the anode reaction consists of the oxidation of methanol, and produce carbon dioxide, electrons and protons. The overall anode reaction is given in equation (1). The proton move from the anode to the cathode via the electrolyte membrane. At the cathode, oxygen is reduced and then recombines with the protons to form water, equation (2). The overall cell reaction for the DMFC is given by equation (3).

Anode:

$$CH_3OH + H_2O \rightarrow CO_2 + 6H^+ + 6e^- \quad (1)$$

Cathode:

$$3/2 O_2 + 6H^+ + 6e^- \rightarrow 3H_2O \quad (2)$$

Overall:

$$CH_3OH + 3/2 O_2 \rightarrow CO_2 + 2H_2O \quad (3)$$

Namely, water and carbon dioxide are produced by reacting methanol with oxygen.

A polymer electrolyte membrane for use in a direct methanol fuel cell should exhibit high proton conductivity, no electron conductivity, high gas impermeability, high form stability, high chemical stability, and high mechanical property, and low water and methanol permeability. Preferably, a suitable polymer electrolyte membrane also has an ion conductivity of $1 \sim 5 \times 10^{-2}$ S/cm, a surface resistance of $0.2 \sim 2 \Omega$ cm$^2$, an operation temperature of 80~120° C., and little or no methanol permeability. Due to its high ion conductivity, Nafion (from DuPont) is the most widely used as an ion exchange membrane for proton exchange membrane fuel cells. In addition to Nafion, generally used ion exchange polymer membranes include XUS (from Dow Chemical), Gore-Select (from Gore & Associates), BAM3G (from Ballad Advanced Materials of Canada), Aciplex (from Asahi of Japan), Flemion (from Asahi Glass), Product C (from Chlorine Engineering), Neospeta-F (from Tokuyama Soda), florinated cation membrane (from Hechst of Germany), and sulfonated polystyrene-block-poly (ethylene-ran-butylene)-block-polystyrene (SSEBS), which is lately being sold by Aldrich.

DMFCs, however, have a "crossover" problem, which is not a problem in PEMFC using hydrogen as a fuel, wherein methanol passes directly through the polymer membrane, from anode to cathode. The proton movement across the membrane is associated with water transport in the solvated shells of membrane. Due to the similar properties of methanol (such as its dipole moment), methanol is also transported to the cathode by electroosmotic drag. At the cathode, methanol causes a mixed potential due to its oxidation and, consequently, a decrease in cell performance. The membrane used in DMFCs were developed for PEM applications for optimising the proton conductivity; however, these membranes are not the optimal with regard to methanol blocking. As a result, there has been active research throughout the world, to develop a proton exchange membrane for DMFCs that is capable of solving the above problems.

To overcome methanol crossover, U.S. Pat. No. 6,059,943 describes a membrane added with inorganic oxide, U.S. Pat. No. 5,919,583 suggests a multi-layered membrane prepared using polymers having different ion exchangeable value, and U.S. Pat. No. 6,060,190 describes a method for inserting an electrode substrate between each layer. None of these proposals, however, has shown any advance in terms of cost or efficiency.

SUMMARY OF THE INVENTION

Any successful research on polymer electrolyte membranes for DMFC necessitates a method for effectively blocking methanol while maintaining the high proton conductivity, i.e., solving methanol crossover problem. It is therefore an object of the present invention to provide an ion exchange polymer membrane that selectively separates methanol while passing water and protons, in which the diffusion of methanol is effectively prevented by a barrier material to inhibit the transmission of methanol on the surface or interior of a polymer membrane.

It is another object of the present invention to provide an ion exchange composite solution capable of coating the surface of an ion exchange membrane, or capable of preparing ion exchange membranes with variable thickness by casting solution.

It is a further object of the present invention to provide an ion exchange composite solution for preparing a catalyst ink solution using a catalyst such as platinum or platinum-ruthenium, which is suitable for coating the ion exchange membrane with the composite solution comprising the barrier during the formation of MEA.

It is still another object of the present invention to provide a method for manufacturing the ion exchange composite membrane.

It is yet another object of the present invention to provide a fuel cell using the above ion exchange composite membrane It is still yet another object of the present invention to provide a fuel cell using the above composite solution.

To achieve these objects and other advantages and in accordance with the purpose of the invention, as embodied and broadly described herein, there is provided an ion exchange membrane comprising an ion-conducting polymeric film filled with clay selected from the group consisting of natural clay and organized organic clay as a barrier material.

BRIEF DESCRIPTION OF THE DRAWINGS

The accompanying drawings, which are included to provide a further understanding of the invention and are incorporated to constitute a part of this application, illustrate embodiments of the invention and together with the description serve to explain the principle of the invention. In the drawings.

DETAILED DESCRIPTION OF THE INVENTION

The present invention relates to an ion exchange composite membrane with a methanol blocking function and especially to a proton exchange composite membrane useful for a liquid fuel cell such as a methanol fuel cell. The ion exchange composite membrane according to the present invention forms a connected network, wherein natural clay or modified organic clay is dispersed in an ion-conducting polymeric film as a barrier material. Importantly, the membrane acts as a separation membrane, selectively blocking alcohol (e.g., methanol) used as a fuel. The proton exchange composite membrane of the present invention can be used as an electrolyte membrane for direct methanol fuel cells. The electrolyte membrane contributes to a significant reduction in methanol crossover, without decreasing its fundamental capability as an electrolyte membrane.

As used herein "natural clay or organic clay is dispersed in polymeric membrane", means that the natural clay or the modified organic clay is dispersed on the surface of the polymeric film as well as inside the polymeric matrix as one compartment. The former (dispersed on the surface of the polymeric film) is prepared by soaking the polymeric film in a solution comprising natural clay or organic clay or by coating a clay composite solution (using, for example, a spraying method) on the polymer surface. The latter (inside the polymeric film) is prepared by soaking the swelled polymeric film in a solution comprising natural clay or organic clay or prepared as a polymeric film by solution casting process of composite polymer electrolyte solution containing natural or organic clay, wherein the polymer solution. To markedly reduce methanol crossover, the clay is preferably intercalated (or imbedded) inside the polymeric matrix film, more preferably, at an ion channel of the ion exchange membrane.

Figure 1:
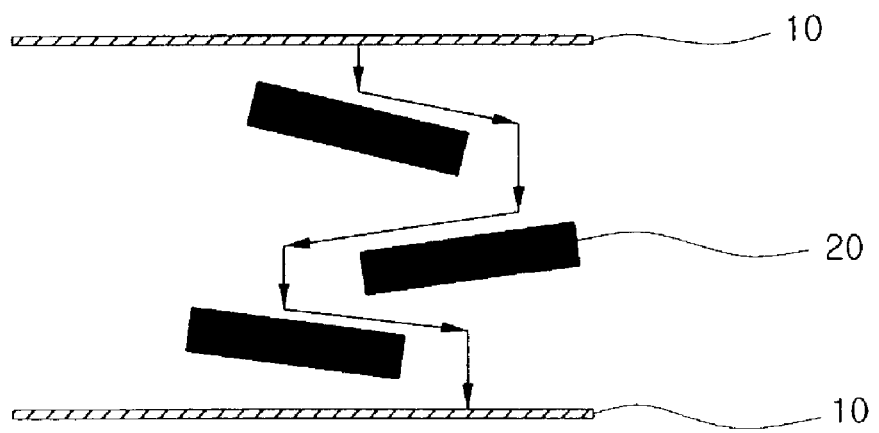
FIG. 1 is a schematic diagram showing the structure of an ion-conducting composite membrane comprising a barrier material in accordance with the present invention.

The clay mineral of natural clay, acting as a barrier material in the present invention, has a silicate layered structure. More particularly, the clay mineral comprises a combination of a silica tetrahydral sheet and an octahydral sheet and, in terms of the collecting place and the inner electro negativity, can be classified as pyrophylite-talc, smectite (monomorillonite), vermiculite, illite, mica, or brittle mica group. The clay generally includes exchangeable cations and water between each silicate layer to be adjusted to inner charge equilibrium. Natural clay has been known as a natural clay having sheet structure of a length of 30~1,000 nm and intervals of several nanometers between each layer. Besides natural clay, the present invention further comprises organic clay. Organic clay is useful for preparing an organic/inorganic hybrid, because is prepared by organizing an agent comprising ionic moiety and hydrophobic moiety, to increase the hydrophobicity of the clay and to extend the intervals between each layer. Moreover, it is well known in the art that organic clay allows organic material to easily penetrate into intervals of layers. It is also well known that the organic clay can selectively transport water, although clay has close intervals due to an inherent electrical charge. Accordingly, the natural or organic clay used in the present invention may inhibit methanol transportation but will little affect proton transportation due to its inner charge. As a result, the ion exchange composite membrane according to the present invention not only maintains proton transportation but also decreases methanol crossover. FIG. 1 shows a schematic model of methanol transportation passing through the ion exchange composite membrane (10) containing clay (20).

The preferred crystalline clay mineral is summarized in Table 1, but is not limited to the following.

TABLE 1

| Type | Formula unit charge | Group | Species | chemical varieties |
|---|---|---|---|---|
| 1:1 | ~0 | Kaolinite | Kaolinite | |
| | | Serpentine | Halloysite | Metahalloysite |
| | | | Antigirite | (dehydrated) |
| | | | Chrysotile | Amesite (Fe$^{2+}$) |
| | | | | Cronstaite |
| | | Pyrophylite | Pyrophylite | Minesotaite |
| | | Talc | Talc | |
| 2:1 | ~0.25–0.6 | Smeetite or montmorillonite | Montmorillonite Saponite | Beidllite Nontronite Volkonkoite Sauconite |
| | ~0.6–0.9 | Vermiculite | Vermiculite | hectorite |
| | ~0.9 | Illite | Illite | |
| | ~1.0 | Mica | Muscovite Phlogopite | Paragonitr Biotite Lepidolite zinnwalddite |
| | ~2.0 | Brittle mica | Magarite Clintonite | |
| 2:1:1 | Variable | Chlorite | Donbassite Sudoite Pennine Clinochlore | |

Table 2 shows examples of modifying agents added to increase the intervals between silicate layers, but is not limited to the following.

TABLE 2

| Chemical formula | Nomenclature |
|---|---|
| $CH_3NH_3{}^+Cl^-$ | Methylamine hydrochloride |
| $CH_3(CH_2)_2NH_2$ | Propyl amine |
| $CH_3(CH_2)_3NH_2$ | Butyl amine |

TABLE 2-continued

| Chemical formula | Nomenclature |
| --- | --- |
| $CH_3(CH_2)_7NH_2$ | Octyl amine |
| $CH_3(CH_2)_9NH_2$ | Decyl amine |
| $CH_3(CH_2)_{11}NH_2$ | Dodecyl amine |
| $CH_3(CH_2)_{16}NH_2$ | Hexadecyl amine |
| $CH_3(CH_2)_{17}NH_2$ | Octadecyl (or stearyl) amine |
| $HOOC(CH_2)_5NH_2$ | 6-aminohexamoic acid |
| $HOOC(CH_2)_{11}NH_2$ | 12-aminododecanoic acid |
| $(CH_3)_4N^+Cl^-$ | Tetramethyl ammonium chloride |
| $CH_3(CH_2)_{17}NH(CH_3)$ | N-methyl octadecyl amine |
| $CH_3(CH_2)_{17}N^+(CH_3)Br^-$ | Octadecyl trimethyl ammonium bromide |
| $CH_3(CH_2)_{11}N^+(CH_3)Br^-$ | Dodecyl trimethyl ammonium bromide |
| $(CH_3(CH_2)_{17})_2N^+(CH_3)Br^-$ | Dioctadecyl dimethyl ammonium bromide |
| $CH_3(CH_2)_{17}N^+(C_6H_6)CH_2(CH_3)_2Br^-$ | Dimethyl benzyl octadecyl ammonium bromide |
| $CH_3(CH_2)_{17}N^+(HOCH_2CH_2)CH_3Cl^-$ | Bis(2-hydroxyethyl)methyl octadecyl ammonium chloride |
| $CH_3(CH_2)_{14}CH_2(C_6H_6N^+)Br^-$ | 1-Hexadecyl pyridium bromide |
| $H_2N(CH_2)_8NH_2$ | 1,6-hexamethylene diamine |
| $H_2N(CH_2)_{12}NH_2$ | 1,12-dodecane diamine |

The ion exchange composite membrane comprising the clay mineral according to the present invention may be prepared in a variety of ways. These methods include, but are not limited to: (1) impregnating natural clay or organic clay of a barrier material into an ion exchange film membrane; (2) producing a composite solution containing a mixture of an ion-conducting polymer solution and barrier materials such as natural clay or organic clay; and (3) spray-drying the composite solution onto a surface of a film membrane. Among these, the first is the most direct method.

Hereinafter, a more detailed description of the above three methods is described.

Figure 2:
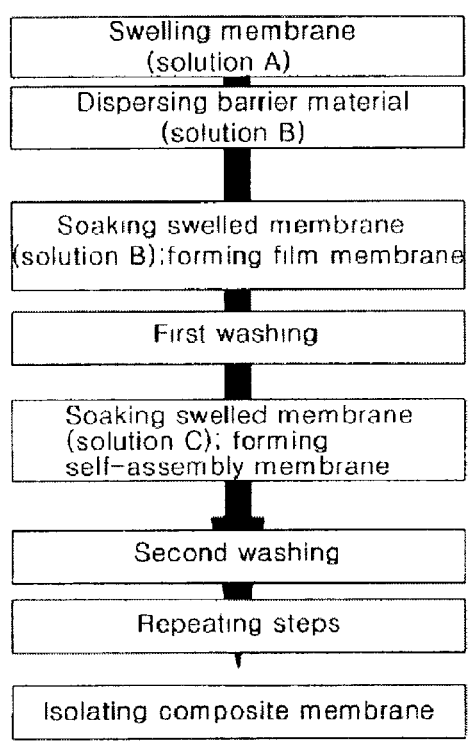
FIG. 2 is a schematic diagram illustrating a process of preparing the ion-conducting composite membrane impregnated with a clay mineral and its microstructure using Nafion having an ion channel comprising a sulfone group.
Figure 2:
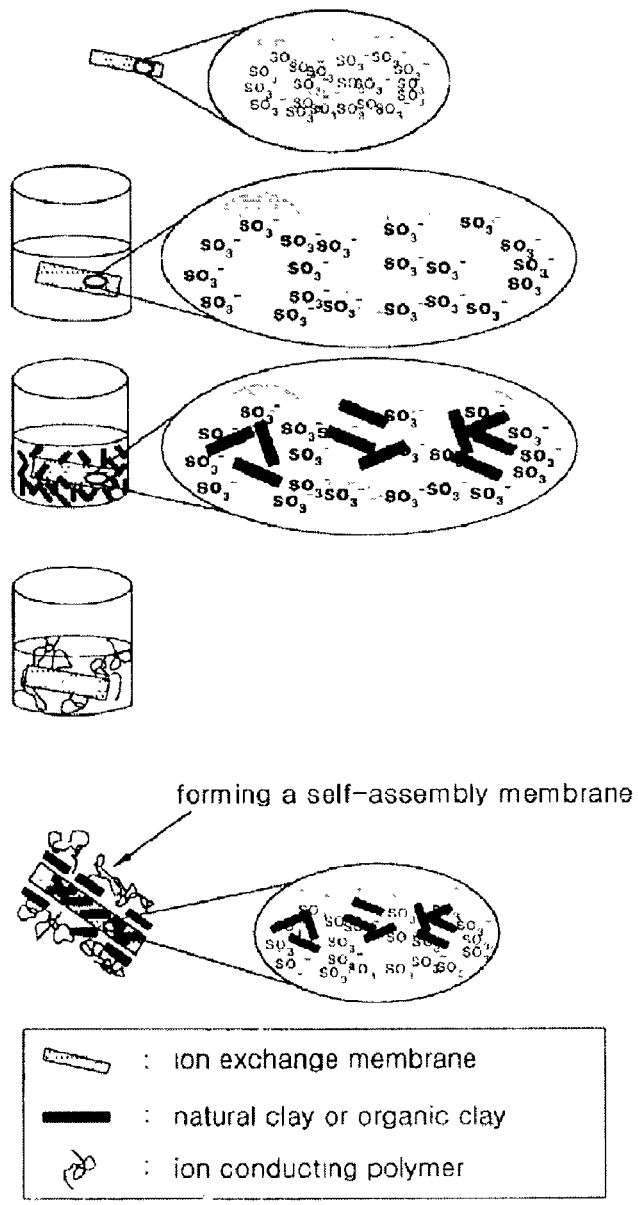

In method (1), shown in FIG. 2, for preparing an ion exchange membrane, a pre-prepared film membrane is soaked in a suitable solvent (solution A) to swell the film membrane. The swelling solvent is preferably selected to swell, rather than dissolve, the film membrane. Next, a barrier material is suspended in a solvent (solution B), which may be the swelling solvent, a related solvent, or a mixture containing the swelling solvent and a solvent capable of dispersing the barrier material. The swelled film membrane is soaked in a suspension solution B dispersing a barrier material and is left to stand for a while (about one day). Thereafter, the membrane of solution B is washed with the solvent used in soaking and then re-soaked in an ion-conducting solution (solution C) of 0.5~20 wt %, preferably 1.5~2 wt %, to form a self assembly membrane. The prepared self-assembly membrane is soaked in solution B and the whole process is repeated. The prepared self-assembly membrane is left to dry and is then re-soaked in deionized water.

The ion exchange film membrane includes, but is not limited to, ion-conducting polymer containing at least one of the ion-conducting moieties, such as sulfonate, carboxylate, phosphate, imide, sulfonimide, or sulfonamide. In a preferred embodiment of the invention, a highly fluorinated polymer, such as Nafion, and a polymer having high stability and proton conductivity, such as SSEBS, are employed. The swelling solvent may be any one capable of swelling an ion-conducting polymer membrane, without dissolving the membrane. It is also preferred for the barrier material to have a high dispersity and swelling and to be capable of being impregnated into the ion-conducting polymer membrane. The barrier material is more preferably employed as natural clay or organic clay. Solution C with an proton conductivity is used for preparing a self-assembly membrane and employs either the same composition used as an ion-conducting film or an ion-conducting polymer having an interaction with the film. The strength of the thus-prepared composite membrane is slightly increased due to the silicate layer.

In method (2) for preparing an ion exchange membrane, the composite solution is prepared by combining a solution D of an ion-conducting polymer solution with a solution E of a suspension dispending a barrier material such as natural clay or organic clay. The ion-conducting polymer used in this art employs preferably a fluorinated polymer such as Nafion or a substituted polymer with a cation exchange group such as sulfonyl or phosphoric group. It is also preferred for the barrier material to have a high dispersity, for example, natural clay or organic clay. The solvent may be any solvent that can swell an ion conducting polymer membrane and interacts with the polymer. The film form of the ion exchange composite membrane manufactured using the composite solution is prepared by drying it over a solvent and is adjusted to a desired thickness using the composite solution.

Method (3) for preparing an ion exchange composite membrane comprises a barrier top layer by spraying the composite solution including natural clay or organic clay onto the surface of an ion exchange membrane.

Here, the ion exchange membrane may be the above-described membrane or a commercially available membrane as a form of film.

In a fuel cell comprising the ion exchange composite membrane, the ion exchange membrane is positioned between an anode compartment containing an anode and a cathode compartment containing a cathode and serves as a separator as well as an electrolyte. The anode and cathode compartments may be any one known in the art. In a preferred embodiment, the ion exchange composite membrane is employed in a direct methanol fuel cell using methanol as a liquid fuel.

DETAILED DESCRIPTION OF PREFERRED EMBODIMENTS

Reference will now be made in detail to the preferred embodiments of the present invention, examples of which are illustrated in the accompanying drawings.

EXAMPLE 1

Sodium montmorillonite $Na_{0.66}(OH)_4Si_8.(Al_{3.34}Mg_{0.66})_{20}$) of high purity from Kunipia F from Kunimine Kogyo Japan was dispersed in a deionized water to form 1 wt % of solution.

Nafion 117 from DuPont was soaked in water to swell and the result was re-soaked into 1 wt % of sodium montmorillonite solution for one day. Thereafter, the membrane was removed from the solution and washed with water. The membrane was then re-soaked in 1 wt % of sodium montmorillonite solution for one hour to form a self-assembly membrane. The resulting membrane was dried for two hours and soaked in water. Thereafter, ion conductivity and methanol permeability were measured. Using conventional gel chromatography, methanol permeability was evaluated by determining the amount of methanol passing through the prepared membrane using 10 wt % of a mixture of methanol and water for a feed solution, and the results are summarized in Table 3.

Table 3 shows that the methanol permeability of the ion exchange composite membrane prepared according to the present invention is reduced without markedly decreasing its proton conductivity.

TABLE 3

|  | Ion conductivity (S/cm) | MeOH permeability (10 wt %, cm$^2$/s) |
| --- | --- | --- |
| Control (Nafion 117) | $3.2 \times 10^{-2}$ | $1.95 \times 10^{-6}$ |
| Example 1 | $3.1 \times 10^{-2}$ | $1.0 \times 10^{-7}$ |

EXAMPLES 2~5

Ion exchange composite membranes were prepared in the same manner as in Example 1, using a variety of organized clays (Southern Clay, USA), wherein a mixture of water, dimethylsulfoxide, and toluene was used as a solvent. A MeOH permeability of 10 wt % was determined, and the results are described in Table 4.

Figure 3:
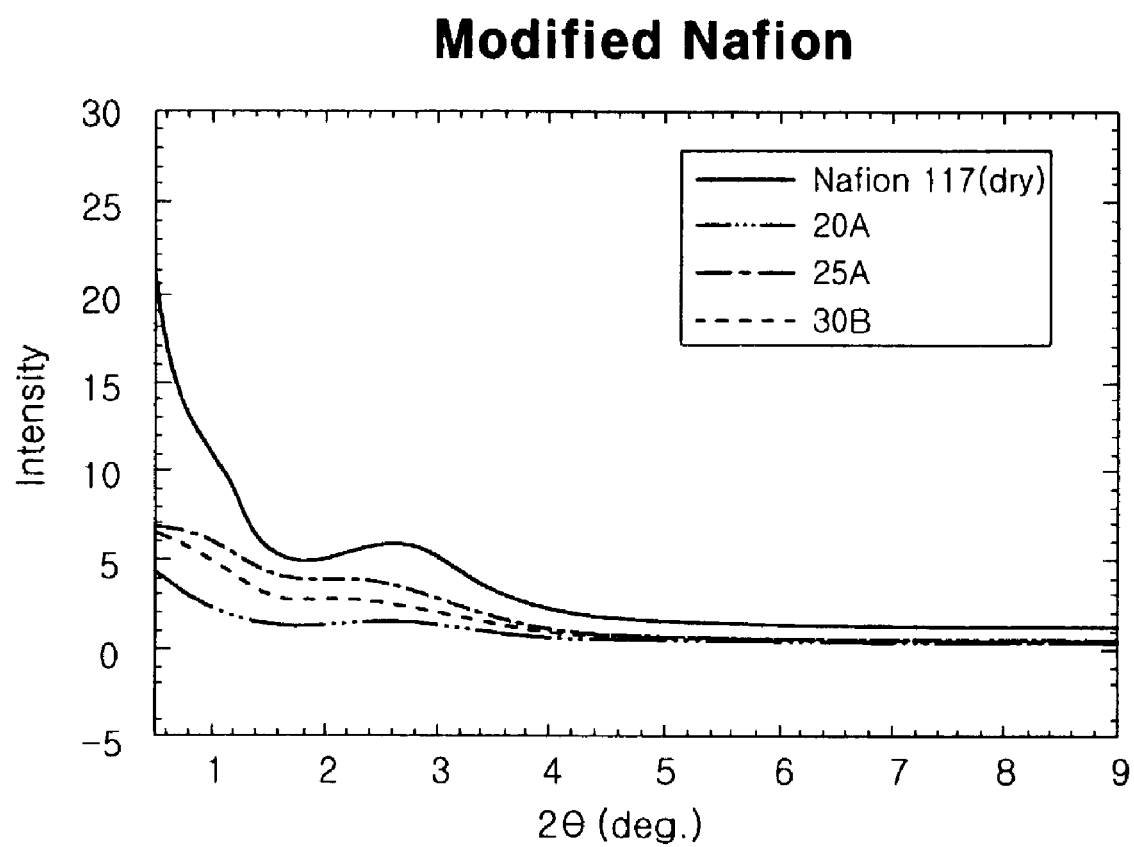
FIG. 3 is a graph resulting from a wide-angle X-ray scattering of the ion-conducting composite membranes of Examples 2~5.

As shown in Table 4, MeOH permeability is reduced, or is zero, without showing a decrease in ion conductivity as in Example 1. On the other hand, to determine the microstructure of the prepared ion exchange composite membrane, wide-angle x-ray scattering was carried out, with the results shown in FIG. 3. Clays Cloisite 6A, 15A, 20A, 25A, and 30B having known intervals, 35.6, 33.2, 24.7, 18.6, 19.0 Å, were used and 2θ of them ranges from about 2° to 5°. According to FIG. 3, as 2θ of Nafion does not show in range from 2° to 5°, these results mean that the ion exchange composite membrane of the control leaves a regularly layered microstructure. Namely, clays impregnated with Nafion may be considered to form composites intercalating or exfoliating each layer.

TABLE 4

|  | Clay | Ion conductivity (S/cm) | MeOH permeability (10 wt %, cm$^2$/S) |
| --- | --- | --- | --- |
| Example 2 | Cloisite 6A | $3.2 \times 10^{-2}$ | $6.6 \times 10^{-7}$ |
| Example 3 | Cloisite 20A | $3.1 \times 10^{-2}$ | $1.0 \times 10^{-7}$ |
| Example 4 | Cloisite 25A | $3.2 \times 10^{-2}$ | No detection |
| Example 5 | Cloisite 30B | $8.2 \times 10^{-2}$ | No detection |

EXAMPLES 6~10

Ion exchange composite membranes were prepared in the same manner as in Example 1, by adding a variety of barrier materials using Nafion 115. The results are summarized in Table 5.

TABLE 5

|  | Clay | Ion conductivity (S/cm) | MeOH Permeability (10 wt %, cm$^2$/S) |
| --- | --- | --- | --- |
| Control 2 (Nafion 115) | — | $3.0 \times 10^{-2}$ | $1.50 \times 10^{-6}$ |
| Example 6 | Cloisite 6A | $3.0 \times 10^{-3}$ | No detection |
| Example 7 | Cloisite 20A | $5.2 \times 10^{-3}$ | $2.5 \times 10^{-7}$ |
| Example 8 | Cloisite 25A | $8.6 \times 10^{-3}$ | No detection |
| Example 9 | Cloisite 30B | $4.6 \times 10^{-2}$ | $1.0 \times 10^{-7}$ |
| Example 10 | Kunipia F | $2.6 \times 10^{-2}$ | $2.7 \times 10^{-7}$ |

EXAMPLE 11

Ion exchange composite membranes were prepared by soaking an SSEBS membrane into 1 wt % of clay solution in a mixture of DMSO and toluene, followed by forming self-assembly membranes in 1 wt % of SSEBS solution. Their properties were determined, and results are summarized in Table 6.

TABLE 6

|  | Clay | Ion conductivity (S/cm) | MeOH Permeability (10 wt %, cm$^2$/S) |
| --- | --- | --- | --- |
| Control 3 | — | $1.6 \times 10^{-2}$ | $2.6 \times 10^{-6}$ |
| Example 11 | Cloisite 6A | $1.6 \times 10^{-2}$ | $1.0 \times 10^{-7}$ |

EXAMPLES 12~17

Ion exchange composite membranes were prepared in the same manner as in Example 4, by varying the amount of Cloisite 25 A as a barrier material, and their properties are summarized in Table 7.

TABLE 7

|  | Conc. of solution B | Ion conductivity (S/cm) | MeOH Permeability (10 wt %, cm$^2$/S) |
| --- | --- | --- | --- |
| Example 12 | 0.01 | $3.2 \times 10^{-2}$ | $1.0 \times 10^{-7}$ |
| Example 13 | 0.1 | $3.1 \times 10^{-2}$ | $5.7 \times 10^{-8}$ |
| Example 14 | 1 | $3.2 \times 10^{-2}$ | No detection |
| Example 15 | 3 | $3.0 \times 10^{-2}$ | No detection |
| Example 16 | 5 | $1.5 \times 10^{-2}$ | No detection |
| Example 17 | 10 | $9.5 \times 10^{-3}$ | No detection |

EXAMPLE 18

The desired ion exchange composite membranes were prepared by adding Cloisite 25A into 5 wt % of Nafion solution (from Aldrich) to form a 1 wt % clay composite solution, forming a film using the obtained composite solution, and then evaporate a solvent to prepare a membrane. The resulting membrane was 100 μm thick and showed no MeOH permeability.

EXAMPLE 19

The desired ion exchange composite membrane was prepared in the same manner as in Example 18, except that the amount of Cloisite 25A was 3 wt %. The membrane obtained was 125 μm thick and showed no MeOH permeability.

EXAMPLE 20

The desired ion exchange composite membrane was prepared in the same manner as in Example 18, except that 5 wt % of SSEBS solution (from Aldrich) was used. In comparison with SSEBS The ion conductivity of the resulting membrane was similar to that of SSEBS, while the MeOH permeability was decreased with respect to SSEBS by a factor of ten.

EXAMPLE 21

The desired ion exchange composite membrane was prepared in the same manner as in Example 19, except that 5 wt % of SSEBS solution (from Aldrich) and 3 wt % of Cloisite were used. In comparison with SSEBS, the ion conductivity of the resulting membrane was reduced about 10%, and MeOH permeability was decreased by a factor of ten.

EXAMPLE 22

The desired ion exchange composite membrane was prepared by coating the solution prepared in Example 18 onto a surface of Nafion membrane, followed by drying. As a result, MeOH permeability was reduced by a factor of about 21 in comparison with that of SSEBS, with no change in ion conductivity.

EXAMPLE 23

The desired ion exchange composite membrane was prepared by spray-coating the solution prepared in Example 20, onto a surface of SSEBS, followed by drying. As a result, the MeOH permeability was zero, with no change in ion conductivity.

Therefore, the ion exchange composite membrane according to the present invention has many advantages, such as providing a selective barrier for methanol, maintaining the proton diffusion, and lower cost.

In addition, the ion exchange composite solution of the present invention can adjust the thickness of the resulting membrane and can be used as a solution for a catalyst ink suitable for preparing a MEA for fuel cell which is manufactured by coating surface with coating agents and catalysts as known in this art. Therefore, thin film formation, using a composite solution described in the present invention, enables a reduction in the size and weight of a miniaturization DMFC.

The forgoing embodiments are merely exemplary and are not to be construed as limiting the present invention. The present invention can be readily applied to other types of apparatuses. The description of the present invention is intended to be illustrative, and not to limit the scope of the claims. Many alternatives, modifications, and variations will be apparent to those skilled in the art.

What is claimed is:

1. An ion exchange membrane comprising clays dispersed in ion-conducting polymeric film, said clays including a modified organic clay organized by at least one agent selected from the group consisting of $CH_3NH_3^+Cl^-$, $CH_3(CH_2)_2NH_2$, $CH_3(CH_2)_3NH_2$, $CH_3(CH_2)_7NH_2$, $CH_3(CH_2)_9NH_2$, $CH_3(CH_2)_{11}NH_2$, $CH_3(CH_2)_{15}NH_2$, $CH_3(CH_2)_{17}NH_2$, $HOOC(CH_2)_5NH_2$, $HOOC(CH_2)_{11}NH_2$, $(CH_3)_4N^+Cl^-$, $CH_3(CH_2)_{17}NH(CH_3)$, $CH_3(CH_2)_{17}N^+(CH_3)Br^-$, $CH_3(CH_2)_{11}N^+(CH_3)Br^-$, $(CH_3(CH_2)_{17})_2N^+(CH_3)Br^-$, $CH_3(CH_2)_{17}N^+(C_6H_5)CH_2(CH_3)_2Br^-$, $CH_3(CH_2)_{17}N^+(HOCH_2CH_2)CH_3Cl^-$, $CH_3(CH_2)_{14}CH_2(C_5H_5N^+)Br^-$, $H_2N(CH_2)_6NH_2$ and $H_2N(CH_2)_{12}NH_2$ as a barrier material.

2. The ion exchange membrane as claimed in claim 1, wherein said ion conducting polymeric film has an ion channel into which clay selected from the group of natural clay and/or modified organic clay is dispersed.

3. The ion exchange membrane as claimed in claim 1, wherein clay-ion exchange polymeric composites include a modified organic clay coated onto a surface of said ion conducting polymeric film.

4. The ion exchange membrane as claimed in claim 1, further comprising a natural clay, said natural clay being at least one selected from the group of layered silicates consisting of pyrophylite-talc, smectite (montmorillonite), vermiculite, illite, mica, brittle mica group, and mixtures thereof.

5. The ion exchange membrane as claimed in claim 1, wherein said ion-conducting polymer comprises at least one selected from the group consisting of sulfonic acid group, carboxylic acid group, phosphoric acid group in its repeating unit.

6. The ion exchange membrane as claimed in claim 1, wherein said ion-conducting polymeric film is Nafion$^R$.

7. The ion exchange membrane as claimed in claim 1, wherein said ion-conducting polymeric film is sulfonated polystyrene-block-poly(ethylene-ran-butylene)-block-polystyrene.

8. The ion exchange membrane as claimed in claim 1, said ion exchange membrane having an ion conductivity greater than $1 \times 10^{-5}$ S/cm at room temperature.

9. A method of preparing an ion exchange membrane comprising dispersed clay in ion-conducting polymeric film as a barrier material, said method comprising steps of:
    (a) soaking so as to swell a prepared film membrane into a solvent;
    (b) soaking the swelled film membrane into a suspension containing said clay, said clay is selected from the group consisting of natural clay and/or organic clay; and
    (c) soaking the swelled membrane into an ion conducting polymeric solution, to form a self assembly membrane.

10. The method as claimed in claim 9, wherein said steps (b) and (c) are carried out repeatedly.

11. A method of preparing an ion exchange membrane comprising dispersed clay in ion-conducting polymeric film as a barrier material, said method comprising steps of:
    (a) dispersing said clay to an ion conducting polymeric solution to form a composite solution, said clay including a modified organic clay organized by at least one agent selected from the group consisting of $CH_3NH_3^+Cl^-$, $CH_3(CH_2)_2NH_2$, $CH_3(CH_2)_3NH_2$, $CH_3(CH_2)_7NH_2$, $CH_3(CH_2)_9NH_2$, $CH_3(CH_2)_{11}NH_2$, $CH_3(CH_2)_{15}NH_2$, $CH_3(CH_2)_{17}NH_2$, $HOOC(CH_2)_5NH_2$, $HOOC(CH_2)_{11}NH_2$, $(CH_3)_4N^+Cl^-$, $CH_3(CH_2)_{17}NH(CH_3)$, $CH_3(CH_2)_{17}N^+(CH_3)Br^-$, $CH_3(CH_2)_{11}N^+(CH_3)Br^-$, $(CH_3(CH_2)_{17})_2N^+(CH_3)Br^-$, $CH_3(CH_2)_{17}N^+(C_6H_5)CH_2(CH_3)_2Br^-$, $CH_3(CH_{217}N^+(HOCH_2CH_2)CH_3Cl^-$, $CH_3(CH_2)_{14}CH_2(C_5H_5N^+)Br^-$, $H_2N(CH_2)_6NH_2$ and $H_2N(CH_2)_{12}NH_2$; and
    (b) casting the composite solution to form the ion conducting polymeric film followed by drying over the solvent.

12. A method of preparing an ion exchange membrane comprising dispersed clay in ion-conducting polymeric film as a barrier material, said method comprising steps of:
    (a) dispersing clay to an ion conducting solution, to form a composite solution, said clay including a modified organic clay organized by at least one agent selected from the group consisting of $CH_3NH_3^+Cl^-$, $CH_3(CH_2)_2NH_2$, $CH_3(CH_2)_3NH_2$, $CH_3(CH_2)_7NH_2$, $CH_3(CH_2)_9NH_2$, $CH_3(CH_2)_{11}NH_2$, $CH_3(CH_2)_{15}NH_2$, $CH_3(CH_2)_{17}NH_2$, $HOOC(CH_2)_5NH_2$, $HOOC(CH_2)_{11}NH_2$, $(CH_3)_4N^+Cl^-$, $CH_3(CH_2)_{17}NH(CH_3)$, $CH_3(CH_2)_{17}N^+(CH_3)Br^-$, $CH_3(CH_2)_{11}N^+(CH_3)Br^-$, $(CH_3(CH_2)_{17})_2N^+(CH_3)Br^-$, $CH_3(CH_2)_{17}N^+(C_6H_5)CH_2(CH_3)_2Br^-$, $CH_3(CH_2)_{17}N^+(HOCH_2CH_2)CH_3Cl^-$, $CH_3(CH_2)_{14}CH_2(C_5H_5N^+)Br^-$, $H_2N(CH_2)_6NH_2$ and $H_2N(CH_2)_{12}NH_2$; and (b) spray coating the composite solution onto the surface of an ion exchange film membrane.

13. A fuel cell comprising:
(a) an anode compartment having an anode;
(b) a cathode compartment having an cathode; and
(c) an ion exchange composite membrane, serving as a separator and electrolyte, with dispersed clay as a barrier material, positioned between the anode and cathode.

14. The fuel cell as claimed in claim 13, said fuel cell being a direct methanol fuel cell using methanol and water mixture as a fuel.

15. A composite solution dispersing clay in an ion conducting polymeric solution, wherein said clay includes a modified organic clay organized by at least one agent selected from the group consisting of $CH_3NH_3^+Cl^-$, $CH_3(CH_2)_2NH_2$, $CH_3(CH_2)_3NH_2$, $CH_3(CH_2)_7NH_2$, $CH_3(CH_2)_9NH_2$, $CH_3(CH_2)_{11}NH_2$, $CH_3(CH_2)_{15}NH_2$, $CH_3(CH_2)_{17}NH_2$, $HOOC(CH_2)_5NH_2$, $HOOC(CH_2)_{11}NH_2$, $(CH_3)_4N^+Cl^-$, $CH_3(CH_2)_{17}NH(CH_3)$, $CH_3(CH_2)_{17}N^+(CH_3)Br^-$, $CH_3(CH_2)_{11}N^+(CH_3)Br^-$, $(CH_3(CH_2)_{17})_2N^+(CH_3)Br^-$, $CH_3(CH_2)_{17}N^+(C_6H_5)CH_2(CH_3)_2Br^-$, $CH_3(CH_2)_{17}N^+(HOCH_2CH_2)CH_3Cl^-$, $CH_3(CH_2)_{14}CH_2(C_5H_5N^+)Br^-$, $H_2N(CH_2)_6NH_2$ and $H_2N(CH_2)_{12}NH_2$.

16. The composite solution as claimed in claim 15, further comprising an electrode catalyst for a fuel cell in use of manufacturing catalyst ink.

* * * * *